Patented Nov. 7, 1944

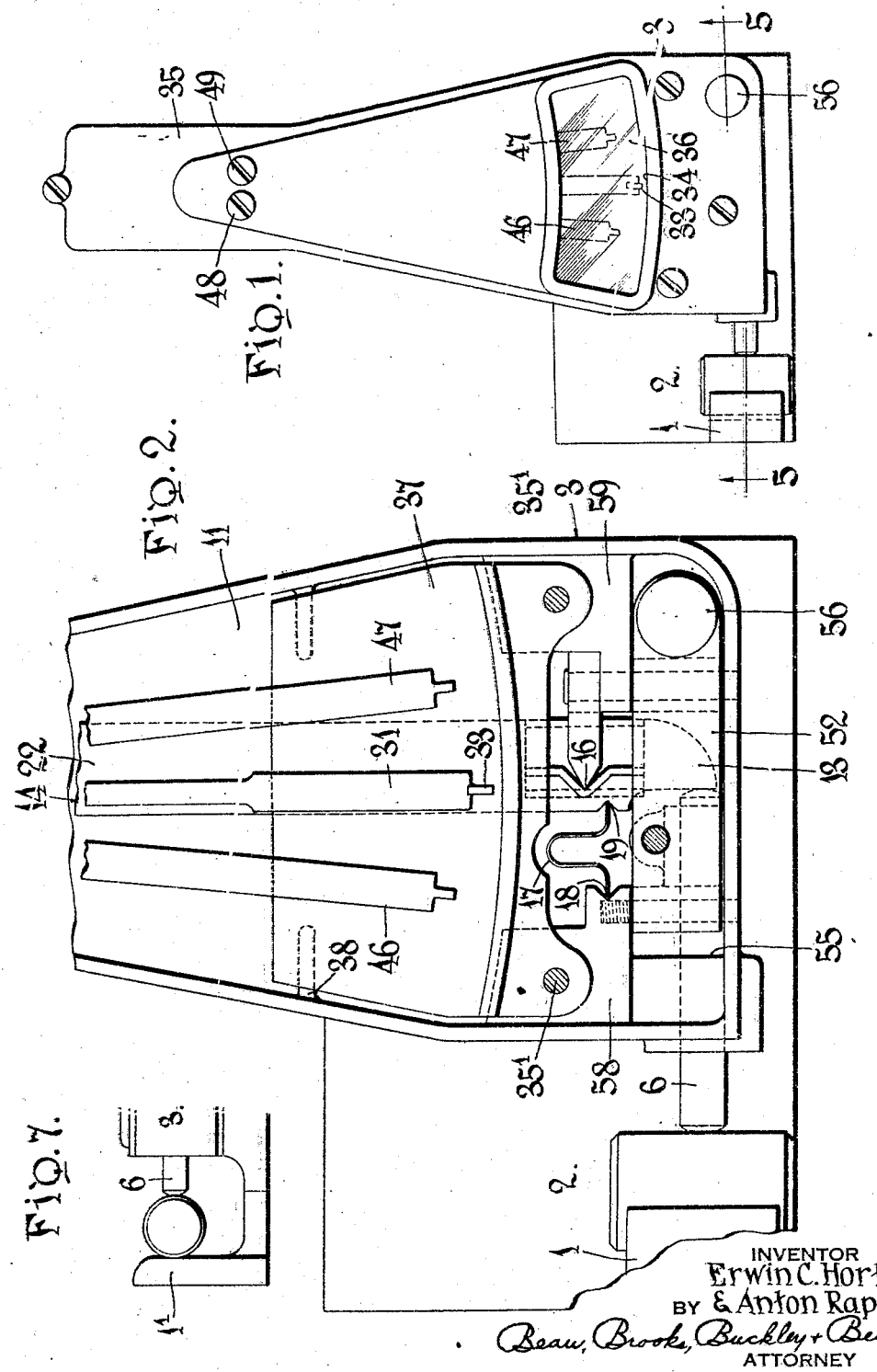

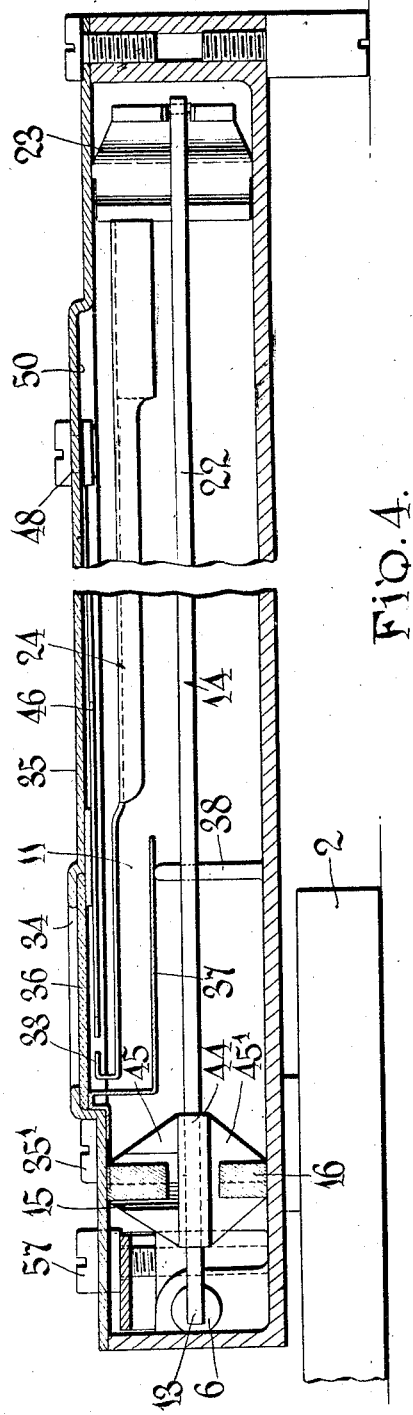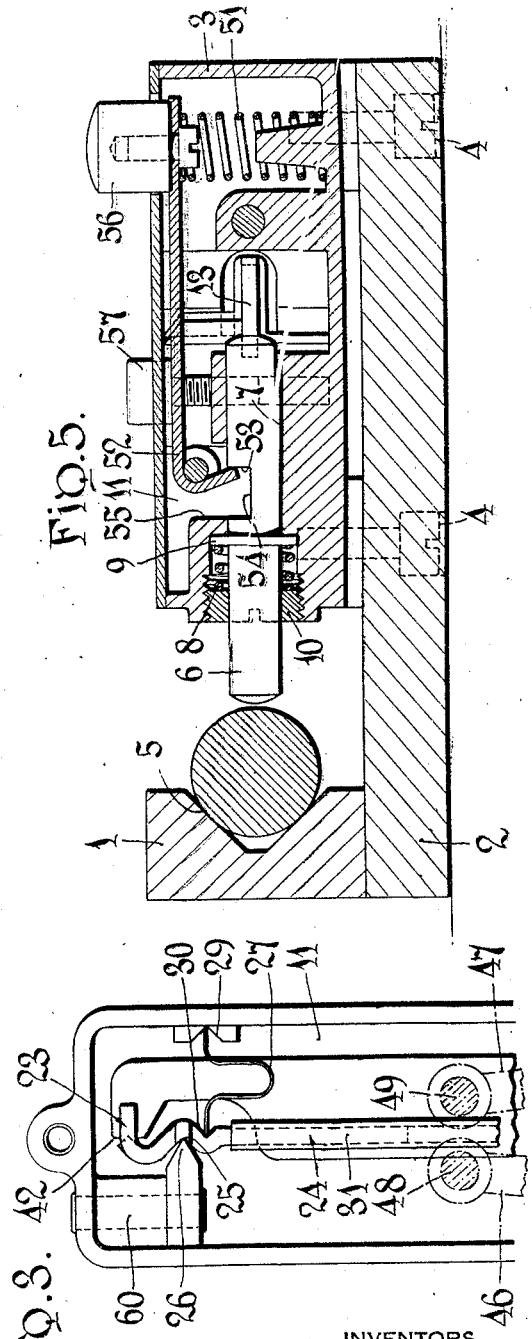

2,362,203

UNITED STATES PATENT OFFICE 2,362,203

MICROMETER GAUGE

Erwin C. Horton, Hamburg, and Anton Rappl, Buffalo, N. Y., assignors to Trico Products Corporation, Buffalo, N. Y.

Application May 4, 1942, Serial No. 441,614

20 Claims. (Cl. 33—147)

This invention relates to a micrometer gauge and has particular reference to the type in which the measurement is amplified through a system of levers for greater accuracy in the reading of minute differences and variations. Gauges of this type usually require a precision setting and resetting by highly skilled men at the factory and therefore they must be carefully handled for otherwise they soon become impractical for shop use.

The object of the present invention is to provide a micrometer gauge which is durable and practical in design for greater efficiency in ordinary shop practice. The invention further resides in a gauge of this type which may be economically produced by mass production methods, and further in certain structural features and arrangements of parts by which greater accuracy is obtained in making the measurements and in securing the readings.

In the drawings:

Fig. 1 is a plan view of the improved micrometer gauge in use;

Fig. 2 is a fragmentary enlarged view of the measuring end of the gauge with the cover plate removed to show the interior construction;

Fig. 3 is a like view of the opposite end of the gauge body;

Fig. 4 is a longitudinal sectional view through the gauge body;

Fig. 5 is an irregular transverse section about on line 5—5 of Fig. 1;

Fig. 7 is a fragmentary view of a modified anvil.

Figure 6:
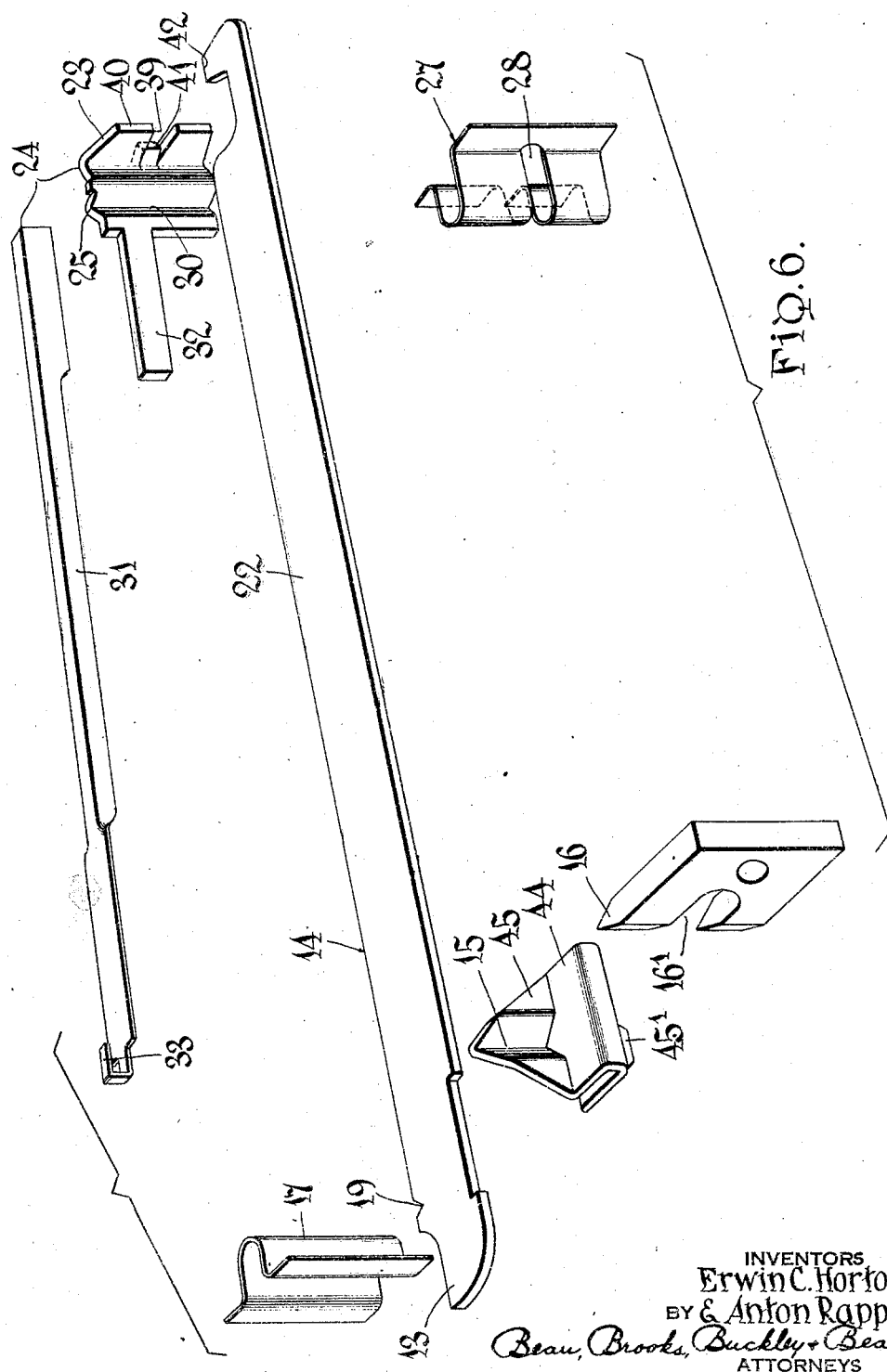
Fig. 6 is an exploded perspective view of the primary and secondary levers and related parts.

Referring more particularly to the drawings, the numeral 1 designates the anvil fixed on the base plate 2 on which the casing 3 for the gauging or micrometer mechanism is removably mounted and secured in a suitable manner, as by screws 4. Any one of several types of anvils for measuring different pieces of work internally as well as externally will be selectively engageable or mountable on the casing by the attaching screws 4 to increase the usefulness of the instrument in the machine shop. Only two anvils have been illustrated herein, one in Fig. 5 with an angular seat 5 and the other in Fig. 7 at 1' having a flat face or seat, both seats being arranged in opposition to a pin 6. This pin 6 is slidably mounted in a bearing 7 and is urged toward a retracted position by a pressure regulating spring 8 which is confined within a counterbore of the bearing 7 between the shaft-carried shoulder 9 and a removable nut 10. The opposite end of the work engaging member or pin 6 protrudes from its bearing 7 into a chamber 11 and finds bearing contact on the shorter arm 13 of a primary amplifying lever 14 which has a bearing 15 pivoting on a knife edge bearing 16, as shown in Figs. 2 and 6. The primary lever 14 is held on its knife edge 16 by a flat spring 17 of generally U-shape design with oppositely directed terminals engaged in opposing V-shaped bearings 18 and 19 provided respectively in a casing body part and the lever. The bearing 19 in the lever is slightly offset from the bearing 15 toward the shorter arm 13.

The longer arm 22 of the primary lever 14 extends lengthwise of the chamber 11 and bears on the shorter arm 23 of a second amplifying lever 24 which has a seat 25 engaging a knife edge bearing 26 in the smaller end of the chamber 11, the secondary lever being retained on its knife edge bearing by a U-spring 27. The spring 27 is bifurcated, having a slot 28 to receive freely the longer arm 22 of the primary lever, and like spring 17 has oppositely directed terminals engaging in opposed V-shaped bearings 29 and 30 on the casing and the lever 24 respectively, the bearing 30 being provided in the longer arm 31 slightly offset from the seat 25. This longer arm may be stamped from light sheet metal and be of channeled cross section to embrace a stub 32 on the heavier body portion of the secondary lever 24 which latter terminates at its free end in a return bend shaped to provide a pointer 33 at the window 34 of the casing cover plate 35. The window may be provided with a glass closure 36. A partition plate 37, anchored along one margin by the cover retaining screws 35' and finding support at its opposite side on the casing ribs 38, provides a background for the pointer 33 and also serves to hide the interior mechanism to view through the window.

By reason of this construction and arrangement of parts above described, the levers may readily be manufactured from sheet metal stock or otherwise economically formed and successively placed upon their knife edge bearings followed by the placement of the retaining springs 17 and 27. This facilitates the assembling of the gauge parts and therefore provides an economical manufacture. While both flat springs 17 and 27 are small and light, yet because of the lever advantage the remote spring 27 will exert a firm pressure of the arm 13 upon the pin 6. However, this pressure is prevented from becoming objectionable and too severe upon the pin by reason of the coiled spring 8 which exerts a counteracting influence and is adjustable to regulate the pressure of the pin upon the work piece being gauged. Simply by turning the nut 10 in or out this regulating function is exercised, it being apparent that the coiled spring influence is insufficient of itself to wholly nullify the action of the spring 27. The sensitivity of the instrument is enhanced by reason of the knife edge mountings of the primary and secondary levers and also by a knife edge engagement between the two levers as shown in Figs. 3 and 6, wherein it will be noted that the shorter arm 23 has an angular terminal formed with an open slot 39 defined by the spaced fingers 40 which guidingly straddle the longer arm 22 to assist in supporting the same. An intermediate stub has a less angular displacement than the guiding fingers 40 to present a sharp edge 41 therebetween for the flat edge 42 of the longer arm 22 to ride and pivot on. This knife edge 41 is thereby properly disposed between the guiding fingers and the longer arm 22 is confined against play by converging the sides of the slot toward the knife edge.

The primary lever may be economically stamped out of flat sheet stock, as shown in Fig. 6, and a saddle 44 fixed thereon having oppositely extending wings 45 and 45'. The bearing 15 is formed in the wing 45 alone since this will serve to hold the companion wing 45' operatively on the knife edge 16 with some degree of flexibility or play sufficient to enable the opposite end of the primary lever being properly alined or registered with its point of contact on the secondary lever 23. Because of this arrangement the knife edge bearing 16 is provided with a slot 16' to freely receive the saddle and its lever.

A pair of tolerance limit members 46 and 47 are mounted on friction held buttons or pivots 48 and 49 on the cover 35 by which the free ends of the members may be adjustably disposed at the window 34 to designate the maximum and minimum limits of tolerance permitted on the particular work. The casing cover is provided with a recessed portion 50 in which the limit members are arranged for compactness. In practice the location of these limit members is determined by master pieces successively placed in the seat 5 of the anvil, one master piece having a maximum tolerance while the other master piece has a minimum tolerance. Therefore, the member 47 will be set for the maximum tolerance and the member 46 set for the minimum tolerance so that when the work pieces are tested, should the pointer 33 move beyond either tolerance indicating member such work piece should be rejected.

The pin 6 is normally held withdrawn or retracted by a spring 51 which acts upon one arm of a bell crank lever 52, the companion arm engaging a shoulder 53 on the pin. This shorter arm may project into a pocket 54 through an opening 55 in the bearing 7. After a work piece has been placed on the anvil, a knob or button 56 carried by the bell crank is depressed against the action of the spring 51 to release the pin 6 for movement by the micrometer spring 27 which presses the pin against the work piece and indicates the measurement with the pointer 33. Upon the release of the operating button 56 the spring 51 will open the anvil to permit the removal of the work.

A set screw 57 may be provided to regulate the extent of upward movement of the longer arm of the bell crank lever 52 by the spring 38 and thereby restrict the withdrawal of the pin 6. When the screw 57 is turned down to its lowermost position, the plunger retracting lever 52 will be rendered inoperative so that the plunger 6 will then be normally projected by the spring 27 of the movement amplifying leverage. Where the anvil has a face with an overhanging part the work piece may be removed laterally after the gauge pin has been retracted.

The bearing 7 may be provided in the pad 58 in one corner of the casing while pads 59 and 60 support the knife edge bearings 16 and 26. The pads 58 and 59 are spaced apart to receive the short arm 13 and the spring 17 therebetween where they are protected by the pad supported partition plate 37.

While the foregoing description has been given in detail it is obvious that the inventive principles herein involved are capable of assuming other physical embodiments without departing from the spirit of the invention as set forth in the appended claims.

What is claimed is:

1. A micrometer gauge having an anvil, a work engaging member mounted for movement toward and from the anvil, a lever bearing on the member to be moved thereby for dimensional indication, means providing fulcrum support for the lever, spring means acting on the lever to project the member toward the anvil to a work engaging position, spring actuated means acting on the member normally to retract the latter from the anvil, quickly releasable manual means operable to render the retracting means inoperative whereby said spring means may function to project the work engaging member, and other means independent of said manual means for disposing said retracting means permanently inoperative.

2. A micrometer gauge having a movably mounted work engaging member, a primary lever acting at one end on said member, a secondary lever acting at one end on the opposite end of the primary lever, resilient means acting on the secondary lever and through the primary lever to press the member against the work, a manually operable bell crank having a short arm engaging the member normally to retract the latter from the work, and resilient means acting on the longer arm of the bell crank to hold the latter in its normal position.

3. A micrometer gauge having a movably mounted work engaging member, and movement amplifying means for giving a dimensional indication and including a primary lever having a short arm acting on said member, a secondary lever acting at one end on the longer arm of the primary lever, one of the last two ends being bifurcated and straddling the other of said last two ends to give support to said longer arm, knife edge fulcrum supports for the two levers, resilient means acting on the primary lever to hold it on its knife edge, and other resilient means serving to hold the secondary lever on its knife edge and acting through both levers to move the member against the work.

4. A micrometer gauge having a movably mounted work engaging member, a primary lever acting at one end on said member, a secondary lever acting at one end on the opposite end of the primary lever, oppositely facing knife edge supports for the two levers, the secondary lever having a seat opposing a fixed seat, the two seats interposed by said opposite end of the primary lever, a flat spring having its ends detachably engaged in the opposed seats to hold the secondary lever in position and acting therethrough and through the primary lever to move the member against a work piece, the flat spring having a slot freely receiving the primary lever, and means removably holding the latter on its support.

5. A micrometer gauge having a movably mounted work engaging member, a primary lever acting at one end on said member, a secondary lever acting at one end on the opposite end of the primary lever, means mounting the levers, the secondary lever having a furcated part deflected toward the primary lever to provide a slot receiving the adjacent end portion of the latter, such adjacent portion having a flat edge, and a transverse bearing for the flat edge at the bottom of the slot.

6. A micrometer gauge having a movably mounted work engaging member, a primary lever acting at one end on said member, a secondary lever acting at one end on the opposite end of the primary lever, a knife edge support for the primary lever, and a saddle fitting the primary lever and having oppositely projecting bearings receiving the knife edge support, one of the projecting bearings having a V-shaped seat while the other is flat to permit play for the proper positioning of the primary lever with respect to the secondary lever.

7. A micrometer gauge having a movably mounted work engaging member, a primary lever acting at one end on said member, a secondary lever acting at one end on the opposite end of the primary lever, a knife edge support for the primary lever, the primary lever having oppositely projecting bearings receiving the knife edge support, one of the projecting bearings having a V-shaped seat while the other is flat to permit play for the proper positioning of the primary lever with respect to the secondary lever, the primary lever having a seat adjacent the projecting bearings, and a flat spring anchored at one end and engaged at its opposite end in the seat to hold the primary lever on its knife edge support.

8. A micrometer gauge comprising a casing having a part formed with a bearing, a pin slidable in the bearing and projecting at one end for engaging a work piece, said casing having a second part with a knife edge, a lever pivoting on the knife edge and having one end acting on the pin, a secondary lever acted upon by the opposite end of the primary lever and having its opposite end overlying the primary lever, a knife edge supporting the secondary lever, spring means for each lever acting to hold them on their knife edge supports, the spring means for the secondary lever acting to project the pin, resilient means normally retracting the pin and manually operable to permit the specified spring means functioning to project the lever, and means for regulating the pressure of the pin against the work piece exerted by said specified spring means.

9. A micrometer gauge having a slidably mounted work engaging plunger, a movement amplifying means operatively engaged with the plunger to be moved thereby for dimensional indication, resilient means acting to project the plunger against the work, a manually operable plunger retracting element operatively connected to the plunger by a movement reducing means having a lesser degree of change than the amplifying means and operable to release the plunger and therethrough control the actuation of the urging means, and resilient means acting on the plunger retracting element for restoring the plunger to its normal position in counteraction of the urging means.

10. A micrometer gauge having a movably mounted work engaging member, a primary lever acting at one end on said member, a secondary lever acting at one end on the opposite end of the primary lever, a knife edge support for the primary lever, the latter having oppositely projecting bearings receiving the knife edge support, one of the projecting bearings having a V-shaped seat while the other is flat to permit slight play for the proper positioning of said opposite end of the primary lever with respect to the secondary lever, said secondary lever having a bifurcated part receiving said opposite end of the primary lever, and said knife edge support having its knife edge divided by a recess to freely receive a primary lever portion between said oppositely projecting bearings.

11. A micrometer gauge comprising a box-like casing with a removable cover, the latter having a window opening defined by an offset flange, a work engaging member movably mounted in the casing and projecting therefrom for engaging a workpiece, a primary lever pivotally mounted in the casing and having one end operatively connected to the work engaging member to be actuated thereby, a secondary lever acted upon by the opposite end of the primary lever and having a pointer serving end overlying the primary lever in spaced relation thereto beneath the window opening, a transparent member closing the window opening and seating on the underside of the offset flange, and a partition plate interposed between the primary lever and the pointer end of the secondary lever to serve as a background for the latter, said partition plate being secured in position between the casing and its cover and having an upstanding part fitting within the window opening opposite one flange portion thereof to cooperate therewith in securing the transparent member in place and additionally to serve as a means for positioning said partition plate.

12. A micrometer gauge having a movably mounted work engaging member, a primary lever having a short arm acting on said work engaging member and a long arm formed with a flat edge, a secondary lever formed with a short arm having sliding contact on the flat edge, said secondary lever having an oppositely extending longer arm serving as a pointer, fulcrum supports for the levers, a spring acting on the secondary lever and through the primary lever to project the work engaging member to its operative position, and a counterbalance spring acting on the primary lever between its fulcrum support and the work engaging member to counterbalance the longer arm of the primary lever by holding the flat edge against the first mentioned arm of the secondary lever.

13. A micrometer gauge having a movably mounted work engaging member, movement amplifying means operable by said member to indicate a dimensional reading and including means resiliently projecting said member to its work engaging position, spring actuated retractor means acting on the work engaging member in counteraction to said resilient means for holding said work engaging member normally retracted for the insertion of a workpiece between the work engaging member and a cooperating anvil, and means operable to hold the retractor inoperative whereby said work engaging member will be normally projected to its work engaging position by said resilient means.

14. A micrometer gauge having a movably mounted work engaging member, a primary lever having a short arm acting on said work engaging member and a long arm, means providing fulcrum support for the lever, a secondary lever having a short arm bearing on said long arm, resilient means acting on the primary lever to hold its long arm in bearing contact with the short arm of the secondary lever, said secondary lever also having an oppositely extending longer arm serving as a pointer, a knife edge support for the secondary lever, said secondary lever being provided on one side with a knife edge bearing receiving said knife edge support, and a spring anchored at one end and having its opposite end acting for exerting pressure against the secondary lever in opposition to and counteraction of the resilient means to hold the secondary lever on its knife edge support and additionally acting through both levers to normally project the work engaging member.

15. A micrometer gauge having a movably mounted work engaging member, a movement amplifying means operatively engaged with the member to be moved thereby for dimensional indication, resilient means acting on the movement amplifying means for urging the same to project the member against the work, a manually controlled retracting element normally acting to retract the member and operable to release the latter for actuation by the resilient means, and resilient means for restoring the manual element to its normal position in counteraction of the first urging means.

16. A micrometer gauge having a slidably mounted work engaging plunger, a movement amplifying means operatively engaged with the plunger to be moved thereby for dimensional indication, means for urging the movement amplifying means to project the plunger against the work, a manually operable plunger retracting element operatively connected to the plunger by a movement reducing means having a lesser degree of change than the amplifying means and operable to release the plunger for actuation by the urging means, means acting on the plunger against the urging means to regulate the pressure exerted by said plunger against the work, and resilient means acting on the plunger retracting element for restoring the plunger to its normal position in counteraction of the urging means.

17. A micrometer gauge comprising a casing having spaced parts defining a chamber leading to a bearing, a contact member movable on the bearing and projecting at one end for engaging a work piece, a lever pivoted in the casing and having one end disposed in the chamber and acting on the contact member, a secondary lever acted upon by the opposite end of the primary lever and having its opposite end serving as a pointer and overlying the primary lever, a cover for the casing having a window adjacent the chamber and a partition plate supported at one edge on said casing parts and extending therefrom over the primary lever and beneath the opposite end of the secondary lever to form a background for the pointer, said cover seating on the edge of the partition plate to retain the latter in place.

18. A micrometer gauge comprising a casing having a part formed with a bearing, a work engaging member movable on the bearing and having a projecting portion for engaging a work piece, said casing having a second part with a knife edge, a lever pivoting on the knife edge and having one end acting on the work engaging member, a secondary lever acted upon by the opposite end of the primary lever and having its opposite end overlying the primary lever, a knife edge supporting the secondary lever, and spring means for each lever acting to hold it on its own knife edge support, the spring means for the secondary lever acting through the primary lever to move the projecting portion of the work engaging member against a workpiece, and the spring means for the primary lever acting upon the latter adjacent its knife edge support at the member side thereof to act on said member in opposition to the other spring means but to mutually cooperate with said other spring means in holding both levers on their knife edge supports.

19. A micrometer gauge comprising a casing having a part formed with a bearing, a pin slidable in the bearing and projecting at one end for engaging a work piece, movement amplifying means acting on the opposite end of the pin for dimensional reading and including a spring for projecting the pin against a work piece, resilient means normally retracting the pin against the spring urge, and manual means operable to render said resilient means inoperative whereby said spring may function to project the pin.

20. A micrometer gauge having a movably mounted work engaging member, a primary lever acting at one end on said member, a secondary lever acting at one end on the opposite end of the primary lever, resilient means acting through the primary lever to press the member against the work, a manually operable bell crank having a short arm acting upon the member normally to retract the latter from the work, resilient means acting on the longer arm of the bell crank to hold the latter in its normal position, and means operable to hold the longer arm permanently depressed against the action of the second resilient means whereby the work engaging member will be normally projected.

ERWIN C. HORTON.
ANTON RAPPL.